No. 720,567. PATENTED FEB. 17, 1903.
E. COUNTS.
CANT HOOK.
APPLICATION FILED JUNE 9, 1902.
NO MODEL.

Witnesses
C. H. Walker,
H. H. Johnson

Inventor
Edmund Counts.
By Eugene H. Johnson
Attorney

UNITED STATES PATENT OFFICE.

EDMUND COUNTS, OF FLAT RIVER, MISSOURI.

CANT-HOOK.

SPECIFICATION forming part of Letters Patent No. 720,567, dated February 17, 1903.

Application filed June 9, 1902. Serial No. 110,927. (No model.)

*To all whom it may concern:*

Be it known that I, EDMUND COUNTS, a citizen of the United States, residing at Flat River, in the county of St. Francois and State of Missouri, have invented new and useful Improvements in Cant-Hooks, of which the following is a specification.

This invention relates to improvements in cant-hooks; and it consists in the construction and combination of the parts, as will be hereinafter set forth, the object being to provide a cant-hook which will have a greater range of adjustment and which will more readily grip a log than those made in the usual manner.

The construction of a cant-hook made in accord with my invention presents a movable hook and a fixed one, the movable hook being connected to the fixed one, so as to have, in addition to the usual pivotal connection, a sliding movement thereon.

Figure 1:
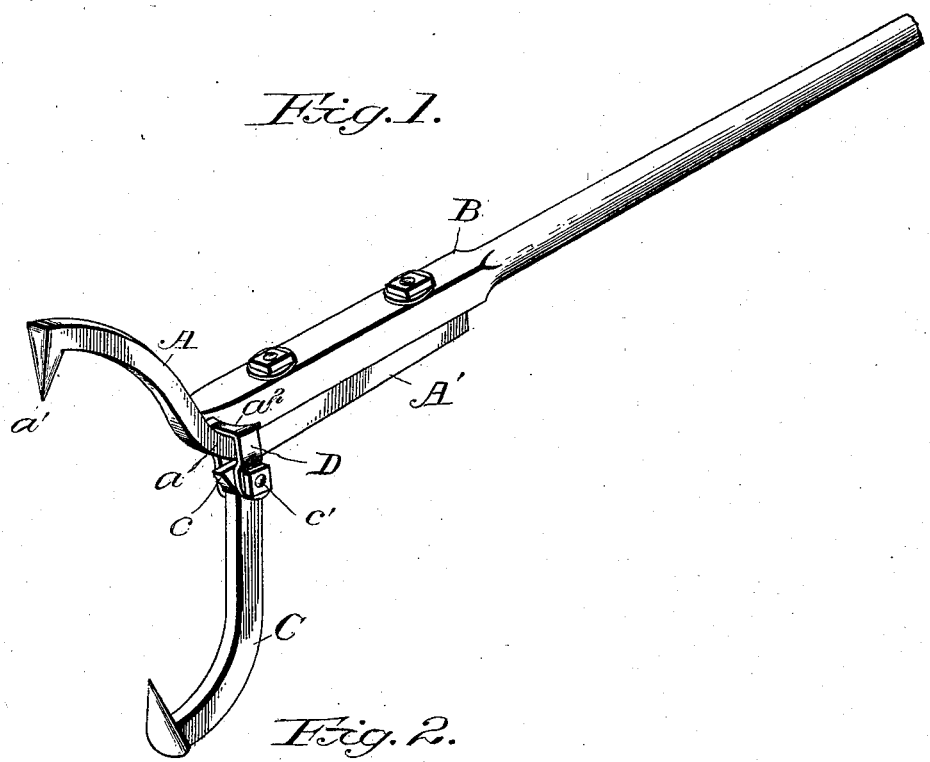
Figure 2:
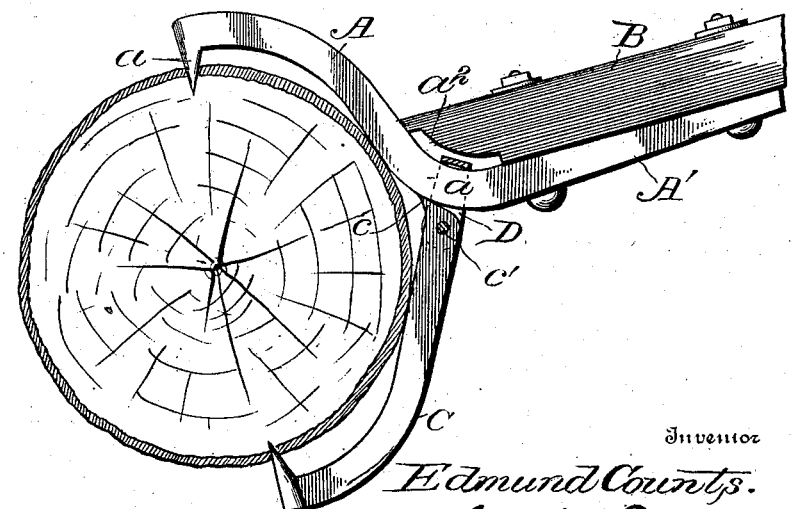

In the accompanying drawings, Figure 1 is a perspective view of a cant-hook made in accord with my invention; and Fig. 2 is a side elevation, partly in section, showing the application of the invention.

One of the hooks A is rigidly attached to a handle B, and said hook has a segmental portion $a$, from one side of which projects a shank A', and on the other side of the segmental portion is the curved or hooked member, which terminates in a spur $a'$. The shank A' has apertures through which pass bolts for connecting the fixed member or hook A to the handle B, the lower end of the handle being squared. The handle B is shaped to lie against the shank, and its lower end is cut away or recessed to provide with the curved portion $a$ of the hook A a slot $a^2$, through which passes a bail or loop D.

C refers to the movable hook, which is pivoted to the bail D, the hook having an offset $c$ to one side of the pivot $c'$, which will impinge against the segmental portion of the fixed hook and bite against that part to limit the swinging movement of the pivoted hook in one direction and to effect a clamping of the bail against the hook A. The bail when the offset is out of engagement with the segmental portion of the hook A will slide on said hook, the range of movement being limited by the shoulders on the handle at the ends of the recess.

By the construction illustrated the swinging hook will adjust itself to span logs of different diameters, and there is a much greater range of adjustment than if the hooks were simply pivoted to each other. An upward movement of the handle will effect an automatic adjusment of the swinging hook, and when the swinging hook is forced into the log the offset or spurs $c$, adjacent to the pivot, will practically lock the hooks. A slight downward movement of the handle will readily detach the cant-hook from a log. The implement is used in the usual manner to roll or turn logs away from the user, though, if desired, the swinging hook may be used uppermost to turn or roll logs toward the user of the implement.

Having thus described my invention, what I claim as new, and desire to secure by Letters Patent, is—

1. In a cant-hook, the combination of a handle, a hook having a segmental portion, a bail in sliding engagement with the segmental portion of the hook, and a hook pivoted to the bail.

2. In a cant-hook, the combination of a handle having a recess in its lower end, a hook having a segmental portion which overlies the recess, means for connecting the hook and handle, a bail in slidable engagement with the segmental portion of the hook which is attached to the handle, a hook pivoted to the bail said hook having an offset or spur for engagement with the segmental portion of the fixed hook, substantially as shown.

In testimony whereof I have hereunto set my hand in the presence of two subscribing witnesses.

EDMUND COUNTS.

Witnesses:
L. N. ANTOINE,
W. A. KENNEDY.